United States Patent
Kim et al.

(10) Patent No.: US 8,558,481 B2
(45) Date of Patent: Oct. 15, 2013

(54) LUMINESCENCE DRIVING APPARATUS, DISPLAY APPARATUS, AND DRIVING METHOD THEREOF

(75) Inventors: Tae-sung Kim, Suwon-si (KR); Jeong-il Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 13/053,984

(22) Filed: Mar. 22, 2011

(65) Prior Publication Data

US 2012/0062148 A1 Mar. 15, 2012

(30) Foreign Application Priority Data

Sep. 10, 2010 (KR) .................. 10-2010-0088980

(51) Int. Cl.
*H05B 37/02* (2006.01)
(52) U.S. Cl.
USPC .......................................... 315/297; 315/307
(58) Field of Classification Search
USPC .................................. 315/297, 307
See application file for complete search history.

(56) References Cited

U.S. PATENT DOCUMENTS

| | | | |
|---|---|---|---|
| 7,583,035 B2* | 9/2009 | Shteynberg et al. | 315/307 |
| 8,179,059 B2* | 5/2012 | Yang et al. | 315/297 |
| 8,232,735 B2* | 7/2012 | Shteynberg et al. | 315/247 |
| 8,339,063 B2* | 12/2012 | Yan et al. | 315/291 |
| 2011/0133645 A1* | 6/2011 | Kuo et al. | 315/77 |
| 2012/0074868 A1* | 3/2012 | Tseng et al. | 315/294 |

\* cited by examiner

*Primary Examiner* — Jason M Crawford
(74) *Attorney, Agent, or Firm* — Sughrue Mion, PLLC

(57) ABSTRACT

A luminescence driving apparatus, a display apparatus, and a driving method thereof are provided. The luminescence driving apparatus includes: a driving circuit which is connected to a light-emitting device and drives the light-emitting device according to a control pulse having a fluctuating amplitude; a controller which, if an internal current of the light-emitting device is less than or equal to a threshold value, selects a position from among a plurality of different positions of the driving circuit based on the amplitude of the control pulse, senses a voltage at the selected position and determines whether a short-circuit has occurred between the light-emitting device and the driving circuit using a level of the sensed voltage; and a protector which if it is determined that the short-circuit has occurred, performs a protection operation with respect to the light-emitting device.

22 Claims, 8 Drawing Sheets

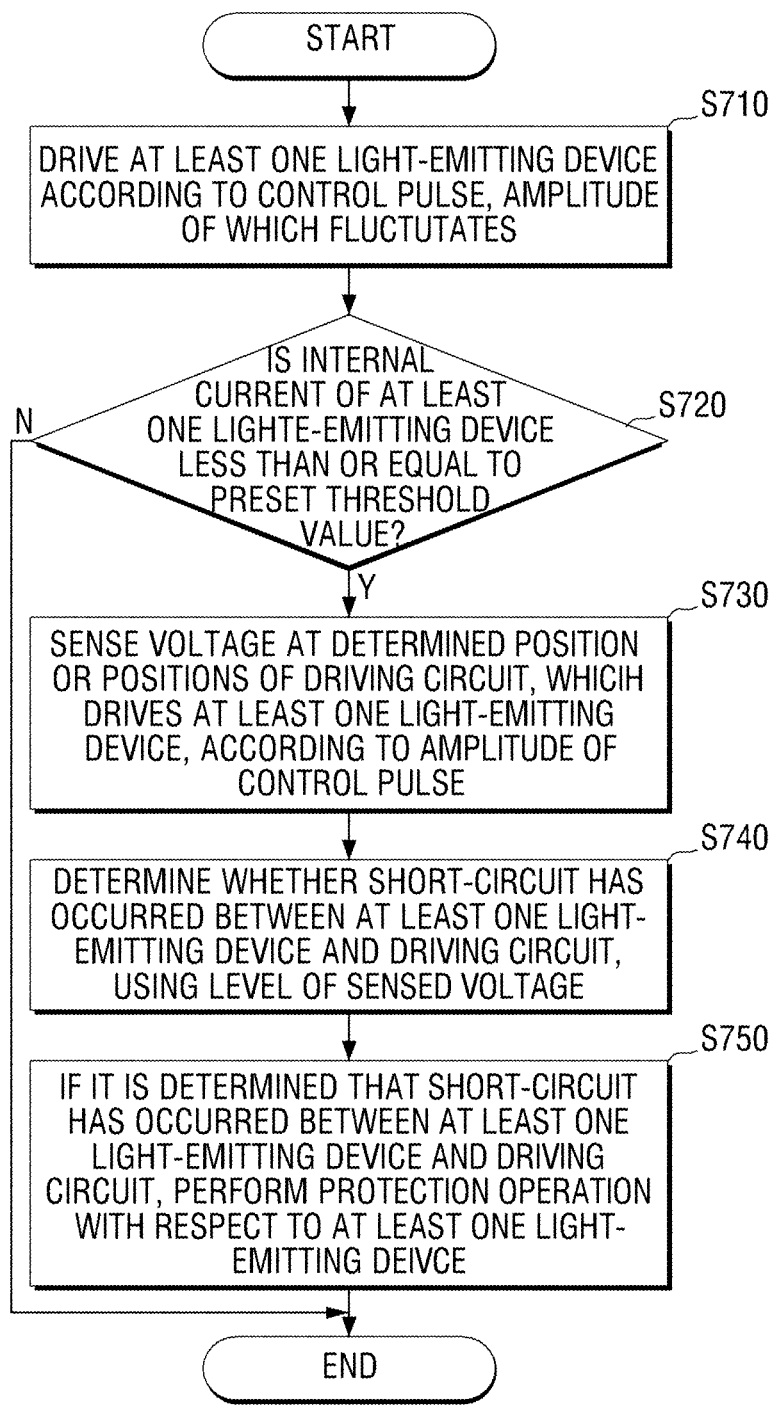

LUMINESCENCE DRIVING APPARATUS, DISPLAY APPARATUS, AND DRIVING METHOD THEREOF

CROSS-REFERENCE TO RELATED APPLICATION

This application claims priority from Korean Patent Application No. 10-2010-0088980, filed on Sep. 10, 2010 in the Korean Intellectual Property Office, the disclosure of which is incorporated herein by reference in its entirety.

BACKGROUND

1. Field

Apparatuses and methods consistent with exemplary embodiments relate to a luminescence driving apparatus, a display apparatus, and a driving method thereof, and more particularly, to a luminescence driving apparatus which is applied to a backlight unit (BLU) of a display apparatus, a display apparatus, and a driving method thereof.

2. Description of the Related Art

Edge-lit type light-emitting diode (LED) backlight units (BLUs) are being actively developed to create slimmer displays. It is economical to drive a plurality of LEDs, which are connected to one another in series, using one driving circuit, and thus it is advantageous for the edge-lit type LED BLU to use a switching type circuit.

In general, an LED module installed in a panel and an LED driving circuit installed outside the panel are connected to each other through a long harness including wires or the like.

Damage may occur to the insulating layer of one or more wires if the wires are pressed by a panel, or a part of a printed circuit board (PCB) pattern of an LED module may short-circuit with a panel chassis ground (GND) when a panel is assembled. Accordingly, a short path may be formed between the LED module and the panel chassis GND as shown in FIG. 1. Since a return path is not formed to a sensing resistor Rs in this case, a current flowing into the sensing resistor Rs becomes zero.

Accordingly, an LED driving circuit recognizes that a current flowing into the LED module is zero, and controls a current so that a maximum of current flows into the LED module. This causes a heat generation problem in the LED driving circuit, and may lead to a breakdown of parts, a breakdown of an LED chip, a serious heat generation problem in the LED module, melting or burning of an LED chip or the like, thereby causing a serious quality problem.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a luminescence driving apparatus which can prevent a breakdown of a light-emitting device, a display apparatus, and a driving method thereof.

According to an aspect of an exemplary embodiment, there is provided a luminescence driving apparatus including a driving circuit which is connected to at least one light-emitting device and drives the at least one light-emitting device according to a control pulse which has a fluctuating amplitude; and a controller which, if an internal current of the at least one light-emitting device is less than or equal to a preset threshold value, senses a voltage at a position of a plurality of different positions of the driving circuit, the position of the plurality of different positions selected based on the amplitude of the control pulse, and determines whether a short-circuit has occurred between the at least one light-emitting device and the driving circuit using a level of the sensed voltage; and a protector which if it is determined that the short-circuit has occurred between the at least one light-emitting device and the driving circuit, performs a protection operation with respect to the at least one light-emitting device.

The driving circuit may include: a transistor switch which receives the control pulse; a first resistor which is connected to an end of the transistor switch; an input port which receives driving power; a first ground which is connected to an end of a first circuit device connected to the input port; an output port which is connected to the at least one light-emitting device; a second ground which is connected to an end of a second circuit device connected to the output port; and a second resistor which is connected between the first and second grounds, wherein the controller senses a current flowing in the first resistor as the internal current of the at least one light-emitting device.

The driving circuit may further include: a filter which is connected to an end of the first resistor; and a current amplifier which is connected to the filter, wherein, if the amplitude of the control pulse has a high value, the controller selects a connection node between the current amplifier and the filter as the position of the plurality of different positions and senses a voltage at the connection node, and, if the amplitude of the control pulse has a low value, the controller selects the second resistor as the position of the plurality of different positions and senses a voltage applied to the second resistor.

The controller may sense a voltage applied to the first resistor if the control pulse has the high value and sense the voltage applied to the second resistor if the control pulse has the low value.

The controller may include: first and second switches which are switched on and/or off according to the amplitude of the control pulse; a first comparator which is connected to the first switch, compares a first voltage sensed from the first resistor with a first reference voltage, and if the first voltage is less than or equal to the first reference voltage, outputs a first signal; a second comparator which is connected to the second switch, compares a second voltage sensed from the second resistor with a second reference voltage, and if the second voltage is less than or equal to the second reference voltage, outputs a signal; and a logic operation unit which is configured to receive the first and second signals, and, if the first or second signal is output from the first or second comparator, outputs a control signal for reporting the short-circuit to the protector.

The protector may perform a protection operation which includes shutting off the driving power applied to the input port of the driving circuit.

The control pulse may be a pulse width modulation (PWM) dimming signal.

The short-circuit occurring between the at least one light-emitting device and the driving circuit may be a chassis ground short.

According to an aspect of another exemplary embodiment, there is provided a luminescence driving apparatus includind a driving circuit which is connected to at least one light-emitting device and drives the at least one light-emitting device according to a control pulse which has a fluctuating amplitude; a controller which if an internal current of the at least one light-emitting device is less than or equal to a preset threshold value, senses a voltage at a preset position of the driving circuit regardless of the amplitude of the control pulse and determines whether a short-circuit has occurred between the at least one light-emitting device and the driving circuit using a level of the sensed voltage; and a protector which, if it is determined that the short-circuit has occurred between the at least one light-emitting device and the driving circuit, performs a protection operation with respect to the at least one light-emitting device, wherein the driving circuit includes: an input port which receives driving power; a first ground which is connected to an end of a first circuit device connected to the input port; an output port which is connected to the at least one light-emitting device; a second ground which is connected to an end of a second circuit device connected to the output port; and a resistor which is connected between the first and second grounds, wherein the resistor is at the preset position and the controller senses a voltage applied to the resistor.

According to an aspect of another exemplary embodiment, there is provided a display apparatus including at least one light-emitting diode (LED) array; a driving circuit which is connected to the at least one LED array and drives the at least one LED array according to a control pulse which has a fluctuating amplitude; a controller which, if an internal current of the at least one LED array is less than or equal to a preset threshold value, senses a voltage at a position of a plurality of different positions of the driving circuit, the position of the plurality of positions selected based on the amplitude of the control pulse and determines whether a short-circuit has occurred between the at least one LED array and the driving circuit using a level of the sensed voltage; and a protector which, if it is determined that the short-circuit has occurred between the at least one LED array and the driving circuit, performs a protection operation with respect to the at least one LED array.

According to an aspect of another exemplary embodiment, there is provided a driving method of a luminescence driving apparatus, the method including driving at least one light-emitting device according to a control pulse which has a fluctuating amplitude; if an internal current of the at least one light-emitting device is less than or equal to a preset threshold value, selecting a position of a plurality of positions of a driving circuit, which drives the at least one light-emitting device, based on the amplitude of the control pulse, and sensing a voltage at the selected position; determining whether a short-circuit has occurred between the at least one light-emitting device and the driving circuit using a level of the sensed voltage; and if it is determined that the short-circuit has occurred between the at least one light-emitting device and the driving circuit, performing a protection operation with respect to the at least one light-emitting device.

The driving circuit may include: a transistor switch which receives the control pulse; a first resistor which is connected to an end of the transistor switch; an input port which receives driving power; a first ground which is connected to an end of a first circuit device connected to the input port; an output port which is connected to the at least one light-emitting device; a second ground which is connected to an end of a second circuit device connected to the output port; and a second resistor which is connected between the first and second grounds, wherein the internal current of the at least one light-emitting device is a current which flows in the first resistor.

The driving circuit may further include: a filter which is connected to an end of the first resistor; and a current amplifier which is connected to the filter, wherein the sensing of the voltage comprises: if the amplitude of the control pulse has a high value, selecting a connection node between the current amplifier and the filter as the position of the plurality of different positions and sensing a voltage at the connection node between the current amplifier and the filter, and. if the amplitude of the control pulse has a low value, selecting the second resistor as the position of the plurality of different positions and sensing a voltage applied to the second resistor.

The sensing of the voltage may include: if the amplitude of the control pulse has the high value, sensing a voltage applied to the first resistor, and if the amplitude of the control pulse has the low value, sensing the voltage applied to the second resistor.

The determination of the occurrence of the short-circuit may include: comparing a first voltage sensed from the first resistor with a first reference voltage using a first comparator connected to a first switch which is switched on and/or off according to the amplitude of the control pulse, and, if the first voltage is less than or equal to the first reference voltage, outputting a first signal; comparing a second voltage sensed from the second resistor with a second reference voltage using a second comparator connected to a second switch which is switched on and/off according to the amplitude of the control pulse, and, if the second voltage is less than or equal to the second reference voltage, outputting a second signal; and, if the first or second signal is output from the first or second comparator, outputting a control single for reporting the short-circuit.

The protection operation may include shutting off the driving power applied to the input port.

The control pulse may be a PWM dimming signal.

The short-circuit occurring between the at least one light-emitting device and the driving circuit may be a chassis ground short.

According to an aspect of another exemplary embodiment, there is provided a driving method of a luminescence driving, the method including driving at least one light-emitting device according to a control pulse which has a fluctuating amplitude; if an internal current of the at least one light-emitting device is less than or equal to a preset threshold value, sensing a voltage at a preset position of a driving circuit regardless of the amplitude of the control pulse and determining whether a short-circuit has occurred between the at least one light-emitting device and the driving circuit, using a level of the sensed voltage; and if it is determined that the short-circuit has occurred between the at least one light-emitting device and the driving circuit, performing a protection operation with respect to the at least one light-emitting device, wherein the driving circuit include: an input port which receives driving power; a first ground which is connected to an end of a first circuit device connected to the input port; an output port which is connected to the at least one light-emitting device; a second ground which is connected to an end of a second circuit device connected to the output port; and a resistor which is connected between the first and second grounds, wherein the resistor is located at the preset position and the sensing of the voltage comprises sensing a voltage applied to the resistor.

According to an aspect of another exemplary embodiment, there is provided a driving controlling method of a display apparatus, the method including driving at least one LED array according to a control pulse which has a fluctuating amplitude; if an internal current of the at least one LED array is less than or equal to a preset threshold value, selecting a position of a plurality of positions of a driving circuit, which drives the at least one LED array, based on the amplitude of the control pulse, and sensing a voltage of at the selected position; determining whether a short-circuit has occurred between the at least one LED array and the driving circuit using a level of the sensed voltage; and if it is determined that the short-circuit has occurred between the at least one LED array and the driving circuit, performing a protection operation with respect to the at least one LED array.

As described above, according to the exemplary embodiments, a breakdown of an LED driving circuit, a breakdown of an LED chip, and PL poorness of an LED module can be prevented, thereby improving quality.

Additional aspects and advantages of the exemplary embodiments may be set forth in the detailed description, may be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which:

FIG. 7 is a flowchart illustrating a driving method of a luminescence driving apparatus according to an exemplary embodiment.

DETAILED DESCRIPTION OF THE EXEMPLARY EMBODIMENTS

Figure 1:
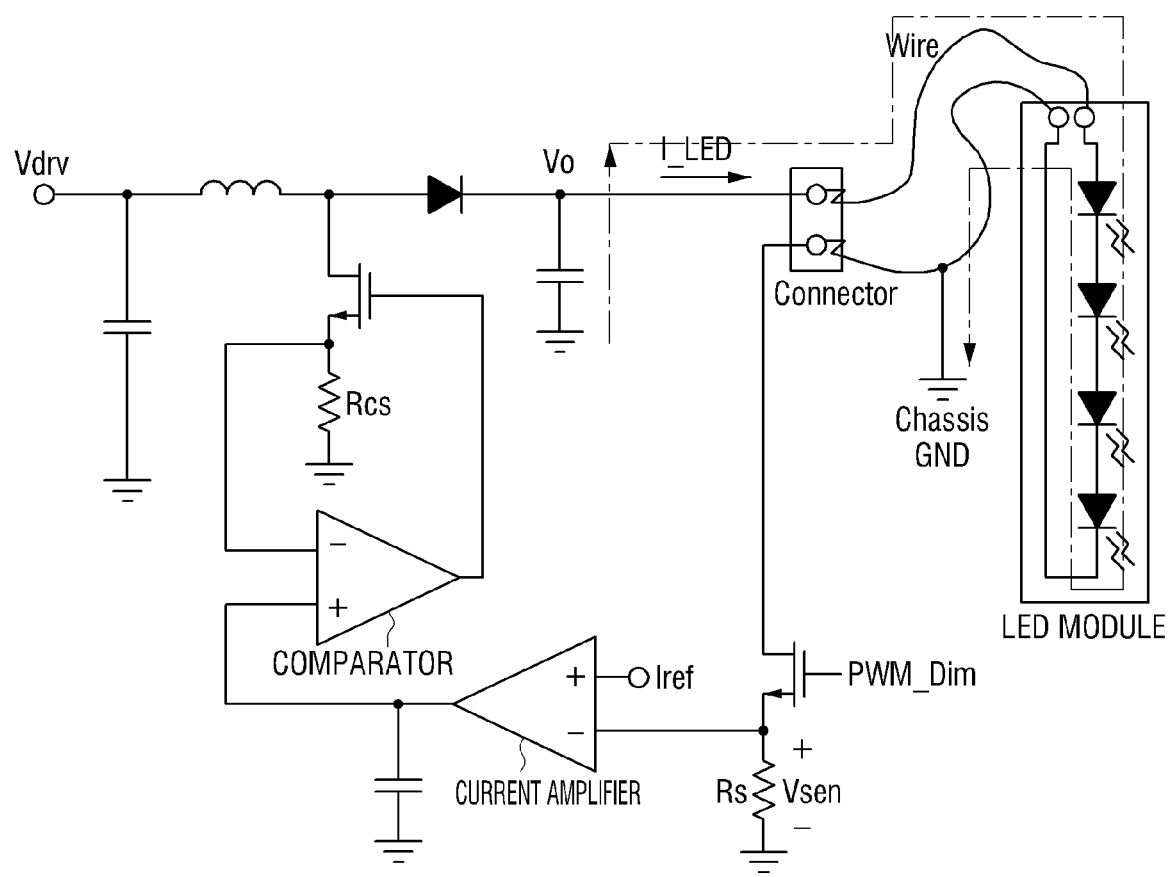
FIG. 1 is a circuit diagram illustrating problems caused by a related art technique.

Hereinafter, exemplary embodiments will be described in greater detail with reference to the accompanying drawings. In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
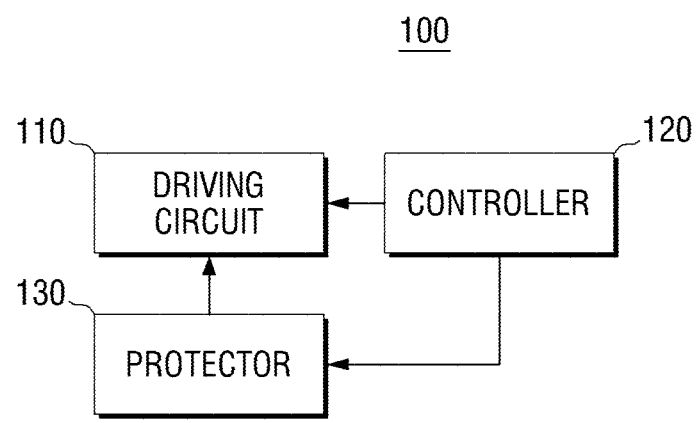
FIG. 2 is a block diagram illustrating a structure of a luminescence driving apparatus according to an exemplary embodiment.

FIG. 2 is a block diagram illustrating a structure of a luminescence driving apparatus 100 according to an exemplary embodiment.

Referring to FIG. 2, the luminescence driving apparatus 100 includes a driving circuit 110, a controller 120, and a protector 130.

The luminescence driving apparatus 100 drives at least one light-emitting device (not shown), for example, and may be realized as a boost type integrated circuit (IC) but is not limited thereto.

Here, the light-emitting device may be realized as a light-emitting diode (LED) array (or an LED module) which is arranged at an edge part of a backlight unit (BLU). In other words, the luminescence driving apparatus 100 may be applied to a driving circuit of an edge-lit type LED BLU. An edge-lit type LED backlight refers to a method of installing an LED array only at a side edge of the edge-lit type LED BLU and radiating light onto a center of a panel, the detailed descriptions of which will be omitted.

The driving circuit 110 is connected to the at least one light-emitting device and drives the at least one light-emitting device according to a control pulse, an amplitude of which fluctuates. Here, the control pulse having the fluctuating amplitude may be a pulse width modulation (PWM) dimming signal.

Figure 4A:
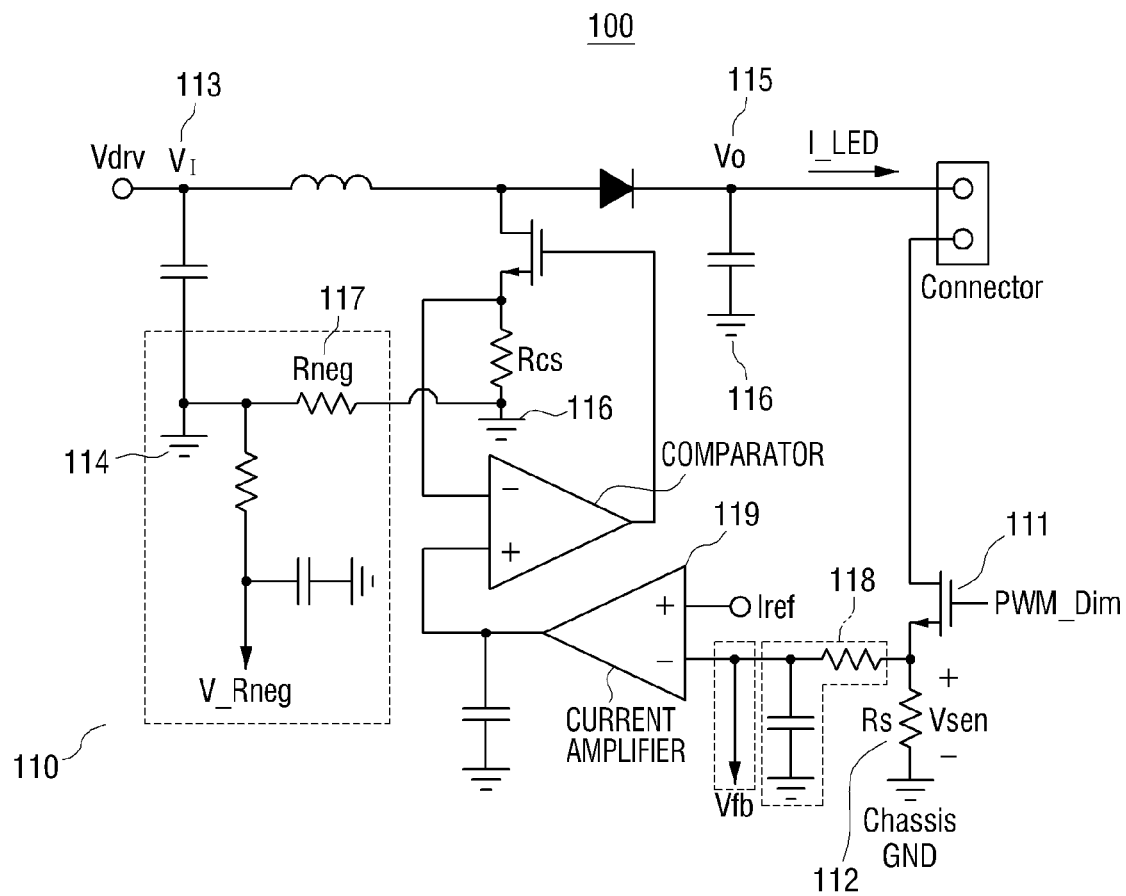
FIGS. 4A to 4C are circuit diagrams illustrating a circuit structure of a luminescence driving apparatus according to an exemplary embodiment.

In more detail, the driving circuit 110 includes a transistor switch, a first resistor, an input port, a first ground, an output port, a second ground, and a second resistor (see e.g., FIG. 4A where a transistor switch 111, a first resistor 112, an input port 113, a first ground 114, an output port 115, a second ground 116, and a second resistor 117 are shown). The control pulse is input into the transistor switch, the first resistor is connected to an end of the transistor switch, and the input port receives driving power. The first ground is connected to an end of a first circuit device which is connected to the input port, and the output port is connected to the at least one light-emitting device. The second ground is connected to an end of a second circuit device which is connected to the output port, and the second resistor is connected between the first and second grounds.

The driving circuit 110 further includes a filter which is connected to an end of the first resistor and a current amplifier which is connected to the filter.

If an internal current of the at least one light-emitting device is less than or equal to a preset threshold value, the controller 120 senses a voltage at different positions of the driving circuit 110 (e.g., at node Vfb or node V_Rneg in FIG. 4A), the position depending on whether the amplitude of the control pulse (e.g., PWM_Dim in FIG. 4A) has a high value or a low value. Here, the first resistor is a sensing resistor Rs, and the controller 120 senses a current, which flows in the first resistor connected to the end of the transistor switch, as the internal current of the at least one light-emitting device. Accordingly, the controller 120 continuously monitors the internal current, and if the controller 120 determines that the internal current is less than or equal to a preset threshold value, the controller 120 starts a short-circuit determination operation to determine whether a short-circuit has occurred between the at least one light-emitting device and the driving circuit 110.

The controller 120 determines whether a short-circuit has occurred between the at least one light-emitting device and the driving circuit 110, using a level of the sensed voltage at one of the positions of the driving circuit 110, the position of which is determined based on whether the amplitude of the control pulse has a high value or a low value. Here, the short-circuit occurring between the at least one light-emitting device and the driving circuit 110 may be a chassis ground short.

In detail, the controller 120 senses a voltage of a connection node between the current amplifier and the filter if the control pulse has a high value, and senses a voltage applied to the second resistor if the control pulse has a low value. In more detail, if the control pulse has the high value, the controller 120 senses a voltage Vfb applied to the first resistor at a node arranged between the current amplifier and the filter.

Figure 4B:
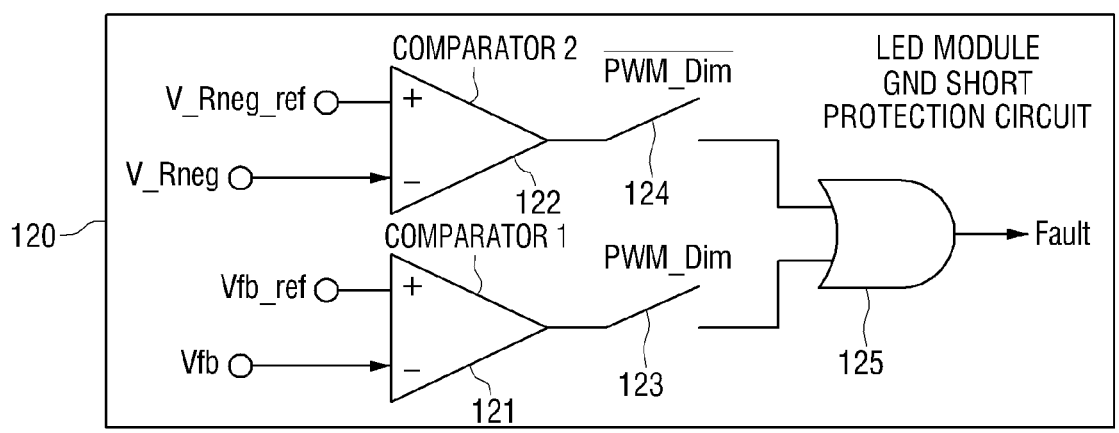

The controller 120 includes first and second switches 121 and 122, first and second comparators 123 and 124, and a logic operation unit 125 (see e.g., FIG. 4B).

The first and second switches are switched on and/or off according to the amplitude of the control pulse, e.g., a PWM pulse dimming signal.

The first comparator 121 is connected to the first switch 123, compares a first voltage Vfb sensed from the first resistor with a first reference voltage Vfb_ref, and, if the first voltage Vfb is less than or equal to the first reference voltage Vfb_ref, outputs a first signal.

The second comparator 122 is connected to the second switch 124, compares a second voltage V_Rneg sensed from the second resistor with a second reference voltage V_Rneg_ref, and, if the second voltage V_Rneg is less than or equal to the second reference voltage V_Rneg_ref, outputs a second signal.

If either of the first or second signal is output from the first or second comparator, the logic operation unit 125 outputs a control signal for reporting a short-circuit state to the protector 130. In other words, the logic operation unit may be realized as an OR logic circuit.

If it is determined that the short-circuit has occurred between the at least one light-emitting device and the driving circuit 110, the protector 130 performs a protection operation with respect to the at least one light-emitting device.

In more detail, the protector 130 performs a protection operation which is to shut off the driving power Vdry applied to the input port 113 of the driving circuit 110.

For example, the protector 130 performs an overvoltage protection (OVP) operation. Here, the OVP operation refers to a function of shutting down an output at a predetermined voltage or more, e.g., may be an operation of switching off a switch which is connected to a light-emitting unit to apply power to the light-emitting unit.

The protector 130 may perform a protection operation such as an overcurrent protection (OCP), an overload protection (OLP), an overtemperature protection (OTP), a short-circuit protection (SCP), or the like.

According to another exemplary embodiment, the controller 120 determines whether the short-circuit has occurred between the at least one light-emitting device and the driving circuit 110, regardless of the amplitude of the control pulse.

In this case, the driving circuit 110 is connected to the at least one light-emitting device and drives the at least one light-emitting device according to the control pulse having the fluctuating amplitude.

If the internal current of the at least one light-emitting device is less than or equal to the preset threshold value, the controller 120 senses a voltage of a preset position of the driving circuit 110 regardless of the amplitude of the control pulse, and determines whether the short-circuit has occurred between the at least one light-emitting device and the driving circuit 110, using a level of the sensed voltage.

If it is determined that the short-circuit has occurred between the at least one light-emitting device and the driving circuit 110, the protector 130 performs a protection operation with respect to the at least one light-emitting device.

The driving circuit 110 includes an input port which receives driving power, a first ground which is connected to an end of a first circuit device connected to the input port, an output port which is connected to the at least one light-emitting device, a second ground which is connected to an end of a second circuit device connected to the output port, and a resistor which is connected between the first and second grounds.

The controller 120 senses a voltage which is applied to the resistor connected between the first and second grounds.

In the above-described exemplary embodiments, the controller 120 and the protector 130 are elements which are installed separately from the driving circuit 110, but this is merely for convenience of explanation. Therefore, the controller 120 may be installed in the driving circuit 110.

Figure 3:
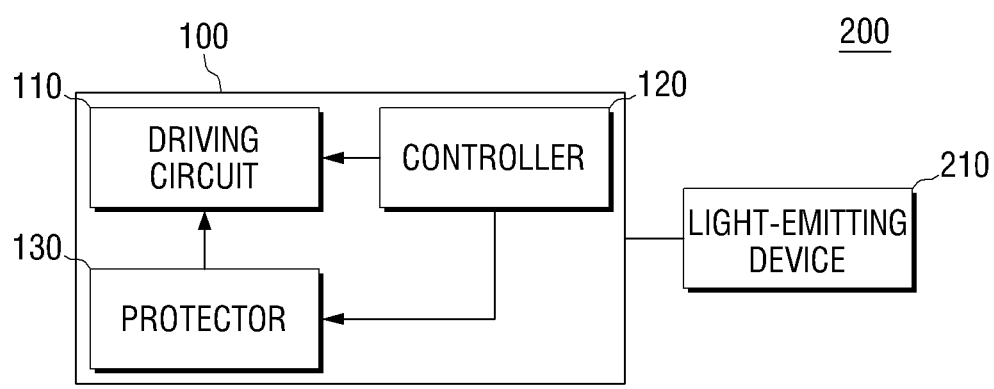
FIG. 3 is a block diagram illustrating a structure of a display apparatus according to an exemplary embodiment.

FIG. 3 is a block diagram illustrating a structure of a display apparatus 200 according to an exemplary embodiment.

Referring to FIG. 3, the display apparatus 200 includes a luminescence driving apparatus 100 and at least one LED array 210.

The display apparatus 200 may be realized as a three-dimensional (3D) image display apparatus including an edge-lit type LED BLU, in more detail, as a liquid crystal display (LCD) 3D television (TV).

In general, an LCD TV cannot self-emit light, and thus includes an LED BLU which projects backlight onto an LCD panel. The LED BLU includes a backlight driving circuit and a light-emitting module.

The display apparatus 200 includes an LCD panel (not shown) which controls transmissivity of light emitted from the LED BLU to visualize an image signal and displays the image signal on a screen.

The display apparatus 200 further includes an image input unit (not shown) and an image processor (not shown).

The image input unit includes a plurality of input terminals, receives a component image signal, a Super-Video Home System (S-VHS) image signal, a composite image signal, and the like from an external device such as a video player or a digital versatile disc (DVD) player through the input terminals, and receives sound signals respectively corresponding to the image signals through the input terminals.

The image processor performs signal processing, such as video decoding, video scaling, frame rate conversion (FRC), or the like, with respect to the image signals or broadcasting contents input from the image input unit. The image processor converts an input image into an image signal which is suitable for the LCD panel and generates a brightness control signal of a BLU.

The luminescence driving apparatus 100 includes a driving circuit 110, a controller 120, and a protector 130.

The driving circuit 110 drives the at least one LED array 210 according to a control pulse, an amplitude of which fluctuates.

The controller 120 senses a voltage at different positions of the driving circuit 110 based on the amplitude of the control pulse, if an internal current of the at least one LED array 210 is less than or equal to a preset threshold value, and determines whether a short-circuit has occurred between the at least one LED array 210 and the driving circuit 110, using a level of the sensed voltage.

If it is determined that the short-circuit has occurred between the at least one LED array 210 and the driving circuit 110, the protector 130 performs a protection operation with respect to the at least one LED array 210.

The present exemplary embodiment exemplifies one LED array 210 for convenience of explanation, but this is merely an exemplary embodiment. Therefore, the same principle may be applied even when two or more LED arrays are arranged.

Although not shown in FIG. 3, the luminescence driving apparatus 100 further includes a voltage sensor (not shown) for an OVP function.

FIG. 4A is a circuit diagram illustrating a circuit structure of a luminescence driving apparatus 100 according to an exemplary embodiment.

Referring to FIG. 4A, the luminescence driving apparatus 100 may be an apparatus which drives a light guide plate (LGP) type edge-lit LED BLU.

In order to construct the LGP type edge-lit LED BLU, bar-shaped LED modules are installed on at least one of four sides of a LGP according to a necessary light amount or a size of a screen. The LED modules installed in a panel are connected to an LED driving circuit installed outside the panel through a harness, which includes wires or the like, so that a constant current corresponding to a desired luminance flows in each LED bar. The constant current flowing in each LED bar is detected by a sensing resistor Rs and is controlled to be equal to a reference current Iref.

The luminescence driving apparatus 100 is connected to at least one light-emitting device (not shown) through a connector (see FIG. 4A) to drive the at least one light-emitting device. In particular, the luminescence driving apparatus 100 drives the at least one light-emitting device according to a control pulse having a fluctuating amplitude, e.g., a PWM dimming signal PWM_Dim.

The luminescence driving apparatus 100 includes a driving circuit and a protector 110 and a controller 120.

In more detail, the driving circuit 110 includes a transistor switch 111, a first resistor 112, an input port 113, a first ground 114, an output port 115, a second ground 116, and a second resistor 117. A gate of the transistor switch 111 receives the control pulse, the first resistor 112 is connected to an end of the transistor switch 111, and the input port 113 receives driving power Vdrv. The first ground 114 is connected to an end of a first circuit device connected to the input port 113, and the output port 115 is connected to at least one light-emitting device. The second ground 116 is connected to an end of a second circuit device connected to the output port 115, and the second resistor 117 is connected between the first and second grounds 114 and 116. The driving circuit 110 further includes a filter 118 which is connected to an end of the first resistor 112 and a current amplifier 119 which is connected to the filter 118. Here, the filter 118 prevents a malfunction caused by noise or the like. If necessary, the driving circuit 110 may further include a counter.

If an internal current of the at least one light-emitting device sensed at the first resistor 112 is less than or equal to a preset threshold value, the controller 120 senses a voltage at different positions of the driving circuit 100, the position depending on whether the amplitude of the control pulse has a high value or a low value. That is, the controller 120 continuously monitors the internal current flowing through the first resistor 112, and if the controller 120 determines that the internal current is less than or equal to a preset threshold value, the controller 120 starts a short-circuit determination operation to determine whether a short-circuit has occurred between the at least one light-emitting device and the driving circuit 110. The controller 120 determines whether a chassis ground short has occurred between the at least one light-emitting device and the driving circuit 110, using a level of the sensed voltage at one of the different positions of the driving circuit.

In more detail, the controller 120 senses a voltage Vfb of the first resistor 112 at a node between the current amplifier 119 and the filter 118, if the amplitude of the control pulse has the high value, and senses a voltage V_Rneg applied to the second resistor 117, if the amplitude of the control pulse has the low value.

FIG. 4B is a schematic circuit diagram illustrating a circuit of the controller 120 according to an exemplary embodiment. The controller 120 includes first and second switches 123 and 124, first and second comparators 121 and 122, and a logic operation unit 125.

The first and second switches 123 and 124 are switched on and/or off according to the amplitude of the control pulse, e.g., the PWM dimming signal (PWM_Dim).

The first comparator 121 is connected to the first switch 123, compares a first voltage Vfb sensed from the first resistor 112 with a first reference voltage Vfb_ref if the PWM dimming signal is on a high level, and outputs a first signal if the first voltage Vfb is lower than or equal to the first reference voltage Vfb_ref. Here, the first switch 123 is on (closed) when the control pulse is high, and off (open) when the control pulse is low.

The second comparator 122 is connected to the second switch 124, compares a second voltage V_Rneg sensed from the second resistor 117 with a second reference voltage V_Rneg_ref if the PWM dimming signal is on a low level, and outputs a second signal if the second voltage V_Rneg is lower than equal to the second reference voltage V_Rneg_ref. Here, the second switch 124 is on (closed) when the control pulse is low, and off (open) when the control pulse is high.

If either of the first or second signal is output from the first or second comparator 121 or 122, the logic operation unit 125 outputs a control signal Fault for reporting a short-circuit state to the protector 110. In other words, the logic operation unit 125 may be realized as an OR logic circuit.

If it is determined that a short-circuit has occurred between the at least one light-emitting device and the driving circuit 110, the protector 130 performs a protection operation which is to shut off the driving power applied to the input port 113 of the driving circuit 110.

Figure 4C:
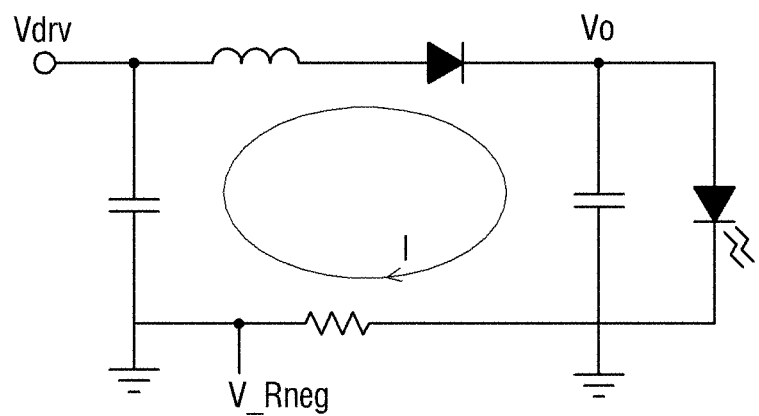

FIG. 4C is a schematic circuit diagram illustrating a circuit operation if a PWM dimming signal is on a low level.

Referring to FIG. 4C, if the PWM dimming signal is on the low level, switch 123 opens, switch 124 closes, and operations of most of the driving circuit 110 stop. However, if a chassis ground short occurs between the driving circuit 110 and the at least one light-emitting device, a current I flows in an area outside the driving circuit 110, through the second resistor 117 (Rneg). In this case, a potential difference occurs due to a current I flowing in a resistor Rneg between an input voltage Vdry and an output voltage Vo, and a voltage V_Rneg is sensed as a negative value. Therefore, if the PWM dimming signal is on the low level, a determination is made as to whether the chassis ground short has occurred between the driving circuit 110 and the at least one light-emitting device, using the voltage V_Rneg.

Figure 5A:
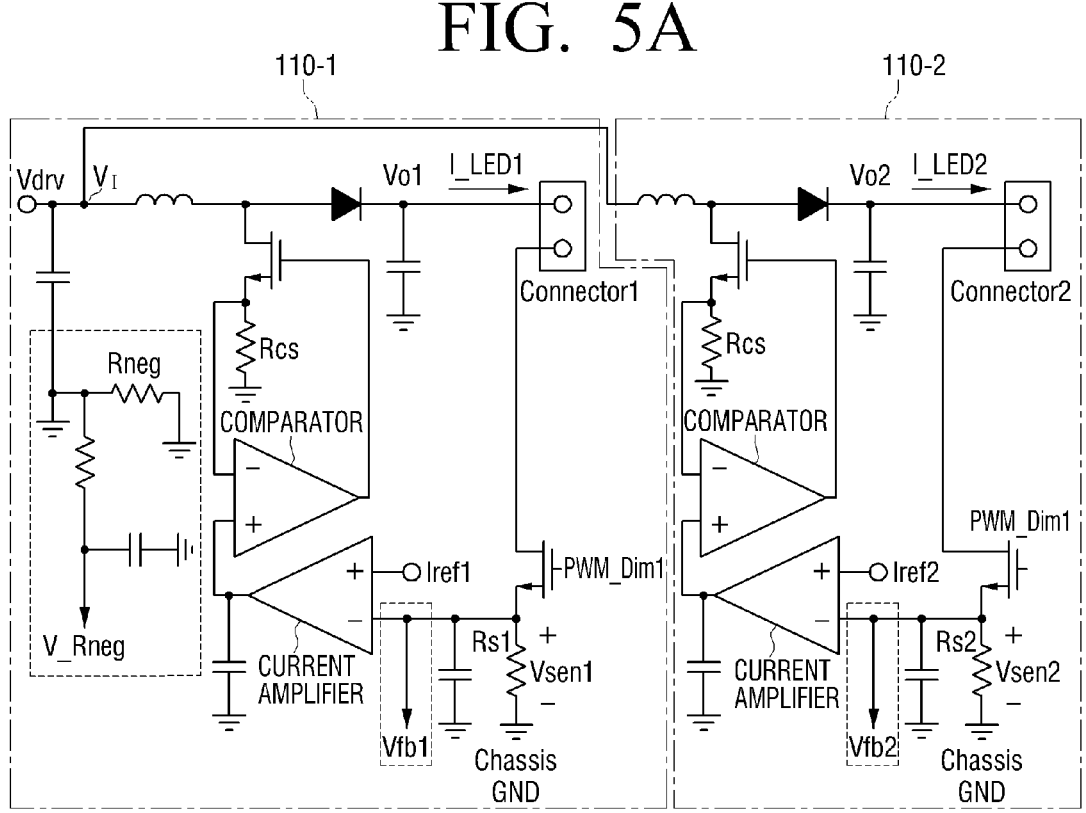
FIGS. 5A and 5B are circuit diagrams illustrating a circuit structure of the luminescence driving apparatus of FIGS. 4A and 4B for driving a plurality of light-emitting devices, according to an exemplary embodiment.
Figure 5B:
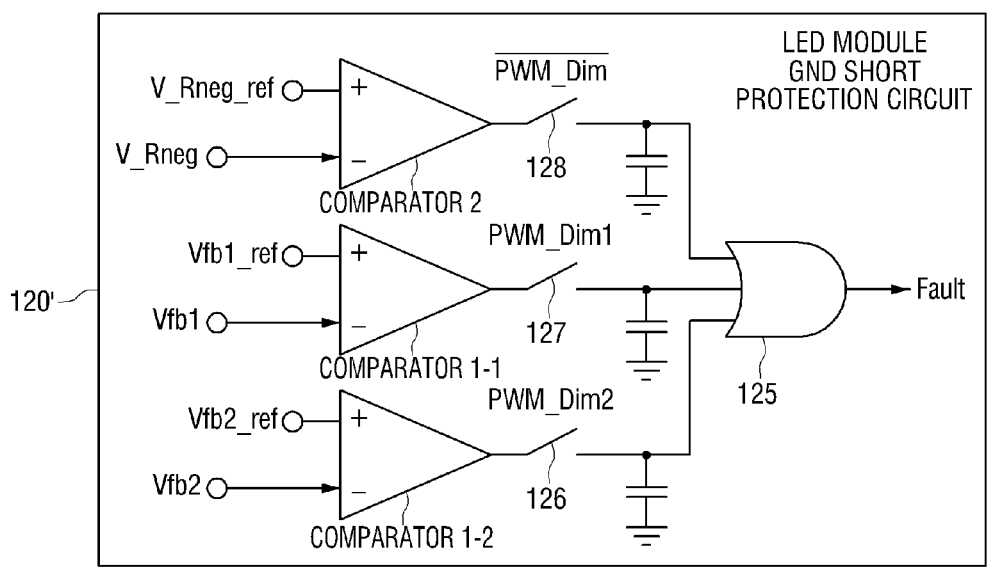

FIGS. 5A and 5B are circuit diagrams illustrating a circuit structure of the luminescence driving apparatus 100 of FIGS. 4A and 4B including a plurality of light-emitting devices, according to an exemplary embodiment.

Referring to FIGS. 5A and 5B, two light-emitting devices (not shown) are respectively connected to first and second driving circuits 110-1 and 110-2 through a first connector (Connector 1) and a second connector (Connector 2), respectively.

Structures of the first and second driving circuits 110-1 and 110-2 are the same as that of the driving circuit 110 of FIG. 4A, and thus their detailed descriptions will be omitted herein.

If each of the internal currents of the two light-emitting devices sensed at first resistors Rs1 and Rs2 of the first and second driving circuits 110-1 and 110-2 are less than or equal to a preset threshold value, a controller 120' senses voltages at different positions of the first and second driving circuits 110-1 and 110-2, the position or positions depending on whether an amplitude of a control pulse is on a high level or on a low level. The controller 120' determines whether a chassis ground short has occurred between the two light-emitting device and the first and second driving circuits 110-1 and 110-2, using levels of the sensed voltages.

In more detail, the controller 120' senses voltages of the first resistors Rs1 and Rs2 if control pulses of the first and second driving circuits 110-1 and 110-2 are on high levels, and senses a voltage applied to a second resistor Rneg if the control pulses are on low levels.

Switch 126 closes when the control pulses are high, and opens when the control pulses are low. Accordingly, a first comparator 1-1 compares a first voltage Vfb1 sensed from the first resistor Rs1 of the first driving circuit 110-1 with a first reference voltage Vfb1_ref, and, if the voltage Vfb1 is less than or equal to the first reference voltage Vfb1_ref, outputs a first signal.

Switch 127 closes when the control pulses are high, and opens when the control pulses are low. Accordingly, a second comparator 1-2 compares a first voltage Vfb2 sensed from the first resistor Rs2 of the second driving circuit 110-2 with a first reference voltage Vfb2_ref, and, if the first voltage Vfb2 is less than or equal to the first reference voltage Vfb2_ref, outputs a first signal.

Switch 128 closes when the control pulses are low, and opens when the control pulses are high. Accordingly, a third comparator 2 compares a second voltage V_Rneg sensed from the second resistor Rneg with a second reference voltage V_Rneg_ref, and if the second voltage V_Rneg is less than or equal to the second reference voltage V_Rneg_ref, outputs a second signal.

If either of the first or second signal is output from the first, second, or third comparator 1-1, 1-2, or 2, a logic operation unit 125 outputs a control signal Fault for reporting a short-circuit state to a protector 130. In other words, the logic operation unit 125 may be realized as an OR logic circuit.

Figure 6:
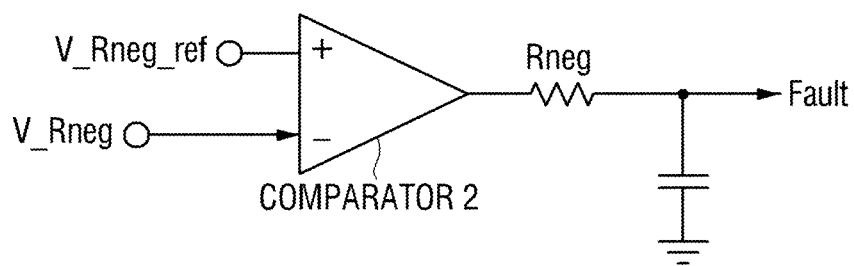
FIG. 6 is a circuit diagram illustrating a circuit structure of a luminescence driving apparatus according to another exemplary embodiment.

FIG. 6 is a circuit diagram illustrating a circuit structure of a luminescence driving apparatus according to another exemplary embodiment.

Referring to FIG. 6, a comparator 2, which is also represented in FIGS. 4B and 5B, compares a second voltage V_Rneg sensed from a second resistor Rneg with a second reference voltage V_Rneg_ref regardless of a PWM dimming signal (i.e., the control pulse), and if the second voltage V_Rneg is less than or equal to the second reference voltage V_Rneg_ref, outputs a second signal. In this case, the second reference voltage V_Rneg_ref is set based on a negative voltage V_Rneg which is on the lowest level in a normal operation. Therefore, if a large amount of current flows due to a chassis ground short, and thus the negative voltage V_Rneg is lower than the second reference voltage V_Rneg_ref, the luminescence driving apparatus 100 determines that a short-circuit has occurred between an LED module and a chassis ground, and outputs a control signal Fault.

FIG. 7 is a flowchart illustrating a driving method of a luminescence driving apparatus according to an exemplary embodiment.

Referring to FIG. 7, the luminescence driving apparatus drives at least one light-emitting device according to a control pulse, an amplitude of which fluctuates (S710). Here, the control pulse may be a PWM dimming signal.

The luminescence driving apparatus determines whether an internal current of the at least one light-emitting device is less than or equal to a preset threshold value (S720).

If it is determined that the internal current of the at least one light-emitting device is less than or equal to the preset threshold value (S720:Y), the luminescence driving apparatus determines at least one position of a plurality of positions of a driving circuit, which drives the at least one light-emitting device, to sense a voltage or voltages, and senses the voltage or voltages at the determined position or positions, the determined position or positions depending on whether the amplitude of the control pulse is high or low (S730). The amplitude of the control pulse may be a high or low value of the PWM dimming signal.

The luminescence driving apparatus determines whether a short-circuit has occurred between the at least one light-emitting device and the driving circuit, using a level of the sensed voltage or voltages (S740). The short-circuit occurring between the at least one light-emitting device and the driving circuit may be a chassis ground short.

If it is determined that the short-circuit has occurred between the at least one light-emitting device and the driving circuit (S740), the luminescence driving apparatus performs a protection operation with respect to the at least one light-emitting device (S750). Here, the protection operation may be a protection operation which is to shut off driving power applied to an input port.

Here, the driving circuit includes a transistor switch, a first resistor, an input port, a first ground, an output port, a second ground, and a second resistor. The transistor switch receives the control pulse, the first resistor is connected to an end of the transistor switch, and the input port receives driving power. The first ground is connected to an end of a first circuit device connected to the input port, and the output port is connected to the at least one light-emitting device. The second ground is connected to an end of a second circuit device connected to the output port, and the second resistor is connected between the first and second grounds. Also, the internal current of the at least one light-emitting device may be a current which flows in the first resistor connected to the end of the transistor switch.

The driving circuit further includes a filter which is connected to an end of the first resistor and a current amplifier which is connected to the filter. The sensing of the voltage (S730) includes: sensing a voltage of a connection node between the current amplifier and the filter, if the control pulse has a high value, and sensing a voltage applied to the second resistor, if the amplitude of the control pulse has a low value. If multiple driving circuits are included (e.g., when multiple light-emitting devices exist), sensing of the voltage (S730) includes: sensing a voltage of a connection node between the current amplifier and the filter in each driving circuit, if the amplitude of the control pulse has a high value.

The sensing of the voltage (S730) includes sensing a voltage applied to the first resistor if the control pulse has the high value and sensing a voltage applied to the second resistor if the control pulse has the low value.

The determination of the occurrence of the short-circuit (S740) includes: comparing a first voltage sensed from the first resistor with a first reference voltage using a first comparator connected to a first switch which is switched on and/or off according to the amplitude of the control pulse, and if the first voltage is less than or equal to the first reference voltage, outputting a first signal. If the first voltage is greater than the first reference voltage, the first signal is not output.

The determination of the occurrence of the short-circuit (S740) further includes: comparing a second voltage sensed from the second resistor with a second reference voltage using a second comparator connected to a second switch which is switched on and/or off according to the amplitude of the control pulse, and if the second voltage is less than or equal to the second reference voltage, outputting a second signal. If the second voltage is greater than the second reference voltage, the second signal is not output.

The determination of the occurrence of the short-circuit (S740) further includes: if the first or second signal is output from the first or second comparator, outputting a control signal for reporting a short-circuit state.

A driving method of a luminescence driving apparatus according to another exemplary embodiment includes: driving at least one light-emitting device according to a control pulse, an amplitude of which fluctuates; if an internal current of the at least one light-emitting device is lower than or equal to a preset threshold value, sensing a voltage at a preset position of a driving circuit regardless of the amplitude of the control pulse and determining whether a short-circuit has occurred between the at least one light-emitting device and the driving circuit, using a level of the sensed voltage; and if it is determined that the short-circuit has occurred between the at least one light-emitting device and the driving circuit, performing a protection operation with respect to the at least one light-emitting device.

Here, the driving circuit includes an input port, a first ground, an output port, a second ground, and a resistor. The input port receives driving power, the first ground is connected to an end of a first circuit device connected to the input port, and the output port is connected to the at least one light-emitting device. The second ground is connected to an end of a second circuit device connected to the output port, and the resistor is connected between the first and second grounds.

The sensing of the voltage includes sensing a voltage applied to the resistor.

A driving method of a display apparatus according to an exemplary embodiment includes: driving at least one LED array according to a control pulse, an amplitude of which fluctuates; if an internal current of the at least one LED array is less than or equal to a preset threshold value, sensing a voltage at at least one of a plurality of different positions of a driving circuit, which drives the at least one LED array, where the position or positions for sensing the voltage is determined based on the amplitude of the control pulse; determining whether a short-circuit has occurred between the at least one LED array and the driving circuit, using a level of the sensed voltage; and if it is determined that the short-circuit has occurred between the at least one LED array and the driving circuit, performing a protection operation with respect to the at least one LED array.

Accordingly, if a situation, such as a short-circuit, occurs between an LED module and a panel chassis GND, the short-circuit can be sensed to perform a protection operation. Therefore, a breakdown of an LED driving circuit, a breakdown of an LED chip, and PL poorness of the LED module can be prevented, thereby improving a quality.

The present general inventive concept can also be embodied as computer readable codes which are encoded on a computer readable recording medium and executable by a hardware processor or computer. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

The foregoing exemplary embodiments and advantages are merely exemplary and are not to be construed as limiting the present general inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A luminescence driving apparatus comprising:
a driving circuit which is connected to at least one light-emitting device and drives the at least one light-emitting device according to a control pulse having an amplitude of which fluctuates;
a controller which, if an internal current of the at least one light-emitting device is less than or equal to a threshold value, senses a voltage at a position selected from among a plurality of different positions of the driving circuit based on the amplitude of the control pulse, and determines whether a short-circuit has occurred between the at least one light-emitting device and the driving circuit using a level of the sensed voltage; and
a protector which, if it is determined that the short-circuit has occurred between the at least one light-emitting device and the driving circuit, performs a protection operation with respect to the at least one light-emitting device,
wherein the controller selects a first position from among the plurality of different positions if the amplitude of the control pulse is a high value, and selects a second position, different from the first position, from among the plurality of different positions if the amplitude of the control pulse is a low value.

2. The luminescence driving apparatus as claimed in claim 1, wherein the driving circuit comprises:
a transistor switch which receives the control pulse;
a first resistor which is connected to an end of the transistor switch;
an input port which receives driving power;
a first ground which is connected to an end of a first circuit device connected to the input port;
an output port which is connected to the at least one light-emitting device;
a second ground which is connected to an end of a second circuit device connected to the output port; and
a second resistor which is connected between the first and second grounds,
wherein the controller senses a current flowing in the first resistor as the internal current of the at least one light-emitting device.

3. The luminescence driving apparatus as claimed in claim 2, wherein the driving circuit further comprises:
a filter which is connected to an end of the first resistor; and
a current amplifier which is connected to the filter,
wherein, if the amplitude of the control pulse has a high value, the controller selects a connection node between the current amplifier and the filter as the position of the plurality of different positions and senses a voltage at the connection node, and, if the amplitude of the control pulse has a low value, the controller selects the second resistor as the position of the plurality of different positions and senses a voltage applied to the second resistor.

4. The luminescence driving apparatus as claimed in claim 3, wherein the controller senses a voltage applied to the first resistor as a first sensed voltage, if the amplitude of the control pulse has the high value, and senses the voltage applied to the second resistor as a second sensed voltage, if the amplitude of the control pulse has the low value.

5. The luminescence driving apparatus as claimed in claim 4, wherein the controller comprises:
first and second switches which are switched on or off based on the amplitude of the control pulse;

a first comparator which is connected to the first switch, compares the first sensed voltage sensed from the first resistor with a first reference voltage, and, if the first sensed voltage is less than or equal to the first reference voltage, outputs a first signal;

a second comparator which is connected to the second switch, compares the second sensed voltage sensed from the second resistor with a second reference voltage, and, if the second sensed voltage is less than or equal to the second reference voltage, outputs a second signal; and a logic operation unit which is configured to receive the first and second signals, and, if the first or second signal is received from the first or second comparator, outputs a control signal for reporting the short-circuit to the protector.

6. The luminescence driving apparatus as claimed in claim 1, wherein the protector performs the protection operation which includes shutting off a driving power applied to an input port of the driving circuit.

7. The luminescence driving apparatus as claimed in claim 1, wherein the control pulse is a pulse width modulation dimming signal.

8. The luminescence driving apparatus as claimed in claim 1, wherein the short-circuit occurring between the at least one light-emitting device and the driving circuit is a chassis ground short.

9. A luminescence driving apparatus comprising:
a driving circuit which is connected to at least one light-emitting device and drives the at least one light-emitting device according to a control pulse having an amplitude of which fluctuates;
a controller which, if an internal current of the at least one light-emitting device is less than or equal to a preset threshold value, senses a voltage at a preset position of the driving circuit regardless of the amplitude of the control pulse, and determines whether a short-circuit has occurred between the at least one light-emitting device and the driving circuit using a level of the sensed voltage; and
a protector which, if it is determined that the short-circuit has occurred between the at least one light-emitting device and the driving circuit, performs a protection operation with respect to the at least one light-emitting device,
wherein the driving circuit comprises:
an input port which receives driving power;
a first ground which is connected to an end of a first circuit device connected to the input port;
an output port which is connected to the at least one light-emitting device;
a second ground which is connected to an end of a second circuit device connected to the output port; and
a resistor which is connected between the first and second grounds,
wherein the resistor is at the preset position and the controller senses a voltage applied to the resistor.

10. A display apparatus, comprising:
at least one light-emitting diode (LED) array;
a driving circuit which is connected to the at least one LED array and drives the at least one LED array according to a control pulse having an amplitude of which fluctuates;
a controller which, if an internal current of the at least one LED array is less than or equal to a preset threshold value, senses a voltage at a position selected from among a plurality of different positions of the driving circuit, based on the amplitude of the control pulse and determines whether a short-circuit has occurred between the at least one LED array and the driving circuit using a level of the sensed voltage; and
a protector which, if it is determined that the short-circuit has occurred between the at least one LED array and the driving circuit, performs a protection operation with respect to the at least one LED array,
wherein the controller selects a first position from among the plurality of different positions if the amplitude of the control pulse is a high value, and selects a second position, different from the first position, from among the plurality of different positions if the amplitude of the control pulse is a low value.

11. A driving method of a luminescence driving apparatus, comprising:
driving at least one light-emitting device according to a control pulse having an amplitude of which fluctuates;
if an internal current of the at least one light-emitting device is less than or equal to a threshold value, selecting a position from among a plurality of positions of a driving circuit, which drives the at least one light-emitting device, based on the amplitude of the control pulse, and sensing a voltage at the selected position;
determining whether a short-circuit has occurred between the at least one light-emitting device and the driving circuit using a level of the sensed voltage; and
if it is determined that the short-circuit has occurred between the at least one light-emitting device and the driving circuit, performing a protection operation with respect to the at least one light-emitting device,
wherein the selecting comprises selecting a first position from among the plurality of different positions if the amplitude of the control pulse is a high value, and selecting a second position, different from the first position, from among the plurality of different positions if the amplitude of the control pulse is a low value.

12. The driving method as claimed in claim 11, wherein the driving circuit comprises:
a transistor switch which receives the control pulse;
a first resistor which is connected to an end of the transistor switch;
an input port which receives driving power;
a first ground which is connected to an end of a first circuit device connected to the input port;
an output port which is connected to the at least one light-emitting device;
a second ground which is connected to an end of a second circuit device connected to the output port; and
a second resistor which is connected between the first and second grounds,
wherein the internal current of the at least one light-emitting device is a current which flows in the first resistor.

13. The driving method as claimed in claim 12, wherein the driving circuit further comprises:
a filter which is connected to an end of the first resistor; and
a current amplifier which is connected to the filter,
wherein the sensing of the voltage comprises: if the amplitude of the control pulse has a high value, selecting a connection node between the current amplifier and the filter as the position of the plurality of different positions and sensing a voltage at the connection node, and, if the amplitude of the control pulse has a low value, selecting the second resistor as the position of the plurality of different positions and sensing a voltage applied to the second resistor.

14. The driving method as claimed in claim 13, wherein the sensing the voltage comprises: if the amplitude of the control pulse has the high value, sensing a voltage applied to the first resistor as a first sensed voltage, and if the amplitude of the control pulse has the low value, sensing the voltage applied to the second resistor as the second sensed voltage.

15. The driving method as claimed in claim 14, wherein the determining whether the short-circuit has occurred comprises:
    comparing the first sensed voltage sensed from the first resistor with a first reference voltage using a first comparator connected to a first switch which is switched on and/or off based on the amplitude of the control pulse, and, if the first voltage is less than or equal to the first reference voltage, outputting a first signal;
    comparing the second sensed voltage sensed from the second resistor with a second reference voltage using a second comparator connected to a second switch which is switched on and/off based on the amplitude of the control pulse, and, if the second voltage is less than or equal to the second reference voltage, outputting a second signal; and
    if the first or second signal is output from the first or second comparator, outputting a control single for reporting the short-circuit.

16. The driving method as claimed in claim 11, wherein the protection operation includes shutting off the driving power applied to the input port.

17. The driving method as claimed in claim 11, wherein the control pulse is a pulse width modulation dimming signal.

18. The driving method as claimed in claim 11, wherein the short-circuit occurring between the at least one light-emitting device and the driving circuit is a chassis ground short.

19. A driving method of a luminescence driving apparatus, the driving method comprising:
    driving at least one light-emitting device according to a control pulse having an amplitude of which fluctuates;
    if an internal current of the at least one light-emitting device is less than or equal to a threshold value, sensing a voltage at a preset position of a driving circuit regardless of the amplitude of the control pulse and determining whether a short-circuit has occurred between the at least one light-emitting device and the driving circuit using a level of the sensed voltage; and
    if it is determined that the short-circuit has occurred between the at least one light-emitting device and the driving circuit, performing a protection operation with respect to the at least one light-emitting device,
    wherein the driving circuit comprises:
        an input port which receives driving power;
        a first ground which is connected to an end of a first circuit device connected to the input port;
        an output port which is connected to the at least one light-emitting device;
        a second ground which is connected to an end of a second circuit device connected to the output port; and
        a resistor which is connected between the first and second grounds,
    wherein the resistor is located at the preset position and the sensing of the voltage comprises sensing a voltage applied to the resistor.

20. A driving method of a display apparatus, the driving method comprising:
    driving at least one LED array according to a control pulse having an amplitude of which fluctuates;
    if an internal current of the at least one LED array is less than or equal to a preset threshold value, selecting a position of a plurality of positions of a driving circuit, which drives the at least one LED array, based on the amplitude of the control pulse, and sensing a voltage at the selected position;
    determining whether a short-circuit has occurred between the at least one LED array and the driving circuit using a level of the sensed voltage; and
    if it is determined that the short-circuit has occurred between the at least one LED array and the driving circuit, performing a protection operation with respect to the at least one LED array;
    wherein the selecting comprises selecting a first position from among the plurality of different positions if the amplitude of the control pulse is a high value, and selecting a second position, different from the first position, from among the plurality of different positions if the amplitude of the control pulse is a low value.

21. A luminescence driving apparatus, comprising:
    a driving circuit which is connected to at least one light-emitting device and drives the at least one light-emitting device according to a control pulse which has a fluctuating amplitude;
    a controller which monitors an internal current of the at least one light-emitting device, and, if the internal current is less than or equal to a present threshold value, performs a short-circuit detection operation,
    wherein, during the performing of the short-circuit detection operation, the controller selects a position from among a plurality of different positions of the driving circuit based on the amplitude of the control pulse, senses a voltage at the selected position, and determines whether a short-circuit has occurred between the at least one light-emitting device and the driving circuit based on a level of the sensed voltage,
    wherein the controller selects a first position from among the plurality of different positions if the amplitude of the control pulse is a high value, and selects a second position, different from the first position, from among the plurality of different positions if the amplitude of the control pulse is a low value.

22. The luminescence driving apparatus of claim 21, further comprising a protector which, if the controller determines that the short-circuit has occurred between the at least one light-emitting device and the driving circuit, performs a protection operation with respect to the at least one light-emitting device.

* * * * *